Sept. 25, 1928.                                                1,685,211
                        L. E. BECK
            HEAT OR PRESSURE RESPONSIVE CIRCUIT CLOSER
                      Filed Aug. 11, 1927
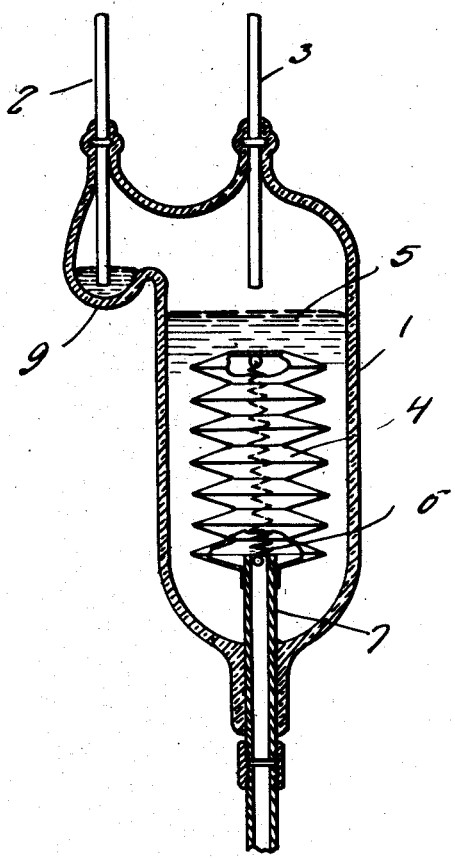
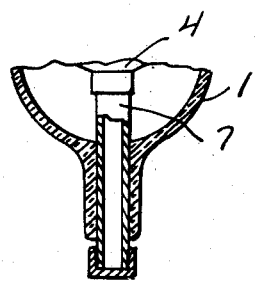
                                                    Inventor
                                          Lester E. Beck,
                                     By
                                                    Attorney Patented Sept. 25, 1928.

1,685,211

UNITED STATES PATENT OFFICE.

LESTER E. BECK, OF KELLY STATION, PENNSYLVANIA.

HEAT OR PRESSURE RESPONSIVE CIRCUIT CLOSER.

Application filed August 11, 1927. Serial No. 212,303.

The present invention relates to a heat or pressure controlled circuit closer and is particularly adapted for electric refrigeration and the like, although not limited to this particular use.

An important object of the invention resides in the provision of a device of this nature which is extremely simple, yet compact in its structure, inexpensive to manufacture, strong and durable, thoroughly efficient and reliable in operation and use, and otherwise well adapted for the purpose for which it is designed.

With the above and numerous other objects in view as will appear as the description proceeds, the invention resides in certain novel features of construction, and in the combination and arrangement of parts as will be hereinafter more fully described and claimed.

In the drawings:—

Figure 1 is a vertical sectional view through the device embodying the features of my invention.

Figure 2 is a detail fragmentary vertical section through the lower portion of a modified form of the structure.

Referring to the drawings in detail, and particularly in the embodiment shown in Figure 1, it will be seen that the numeral 1 denotes a tube of glass or equivalent material which is provided in one side wall intermediate its upper and lower ends with a pocket or trap 9. The electrodes 2 and 3 enter the tube and are to be connected to the control circuit, these electrodes are sealed in the glass or other like material.

A bellows or other type of expansible gas actuated element 4 is immersed in a controlling liquid such as mercury 5, the quantity of this liquid being such that when the pressure within the bellows is that at which it is desired to have the electric circuit closed, the level of the mercury will be such as to just close the liquid path between electrodes 2, and 3, a certain amount of mercury or like liquid being always in the trap 9 so as to make a quick and efficient contact. A spring 6 is disposed in the bellows and is tensioned so as to resist the expansion of the bellows. This spring may be internal as shown, external or a part of the make-up of the bellows itself. The tube or conductor 7 is sealed in the bottom of the glass tube and connects the bellows with the vessels whose pressure is to control the electric circuit. If desired, a modification may be used as in Figure 2, wherein this tube 7 is closed and a certain amount of the gas and liquid may be stored therein.

The action is as follows:—As the pressure in the bellows 4 increases, it expands to the point where the spring tension balances it, so that for every pressure, there is a given distension of the bellows. In expanding the bellows displaces liquid, and thus raises the mercury to the point where the circuit is closed. Here it is seen that the quick make and break action is obtained by means of the cohesive force of the mercury, and thus eliminating the necessity of storing energy for a quick make and break as has become the practice.

If it is desired to use the apparatus for a temperature control, the tube 7 may be closed as is shown in Figure 2 and the bellows partly filled with some liquid such as carbon-tetrachloride.

It is thought that the construction, operation and advantages of this invention will now be clearly understood by those skilled in this art without a more detailed description thereof. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:—

1. A device of the class described comprising a vessel, an electric conducting fluid partly filling the vessel, a bellows immersed in the fluid, a pair of electrodes extending into the vessel so that when the bellows expands the fluid is displaced to cause the immersion of the electrodes for closing a circuit.

2. A device of the class described comprising a vessel, an electric conducting fluid partially filling the vessel, a bellows immersed in the fluid, a pair of electrodes extending into the vessel so that when the bellows expands the fluid is displaced to cause the immersion of the electrode for closing a circuit, said vessel having a trap in the side wall thereof for holding a certain amount of said fluid and one of said electrodes in contact with the fluid in the trap at all times.

3. A device of the class described comprising a vessel, an electric conducting fluid partially filling the vessel, a bellows immersed in the fluid, a pair of electrodes extending into the vessel so that when the bellows expands the fluid is displaced to cause the immersion of the electrode for closing a circuit, said vessel having a trap in the side wall thereof for holding a certain amount of said fluid and one of said electrodes in contact with the fluid in the trap at all times, a spring in the bellows for normally holding the same contracted.

4. A device of the class described comprising a vessel, an electric conducting fluid partially filling the vessel, an expansible fluid displacing member immersed in the fluid, said vessel being formed with a trap, and an electrode extending into the trap so that when the member expands to displace the fluid, said fluid will cause the contact with the electrode extending into the trap.

5. A device of the class described comprising a vessel, an electric conducting fluid partially filling the vessel, a pressure responsive expansible member immersed in the fluid, and an electrode extending into the vessel to be engaged by the fluid when displaced by the expansion of the member.

6. A device of the class described comprising a vessel, an electric conducting fluid partially filling the vessel, a pressure responsive expansible member immersed in the fluid, a pair of electrodes extending into the vessel so that when the member expands the fluid is displaced to cause the immersion of the electrodes for closing a circuit.

7. A device of the class described comprising a vessel, an electric conducting fluid partially filling the vessel, a pressure responsive expansible member immersed in the fluid, a pair of electrodes extending into the vessel so that when the member expands the fluid is displaced to cause the immersion of the electrodes for closing a circuit, said vessel having a trap in the side wall thereof for holding a certain amount of said fluid and one of said electrodes being in constant contact with the fluid in the trap.

In testimony whereof I affix my signature.

LESTER E. BECK.